Oct. 5, 1937.   M. E. VAN ORDEN   2,094,861
EYEGLASS CASE
Filed July 28, 1936

MILLARD E. VAN ORDEN
INVENTOR.

BY Robert V. Morse
ATTORNEY.

Patented Oct. 5, 1937

2,094,861

UNITED STATES PATENT OFFICE 2,094,861

EYEGLASS CASE

Millard E. Van Orden, Ithaca, N. Y.

Application July 28, 1936, Serial No. 92,948

5 Claims. (Cl. 206—6)

This invention relates to eyeglass cases, particularly to pocket cases used for carrying eyeglasses when not in use, and has for its object the prevention of breakage of eyeglasses while in the case. While the ordinary case is supposed to protect glasses from breakage, it is nevertheless a fact that a very considerable proportion of breakages occur while the glasses are in the case. The owner is not so careful when the glasses are in the case, and the case may fall from a table, or drop out of a pocket, with the result that the glasses are often found broken. Rimless glasses are particularly sensitive to this type of damage.

Being impressed with the frequency of this type of breakage, I have made a study of its causes, and have determined that in order to adequately protect against breakage in the case, the glasses must be yieldingly held against lateral or end motion impact, as well as cushioned on their flat sides. The case falls as often on its end as it does on its side, or flat. If the glasses are held rigidly in the case, they will break; and on the other hand, if they are merely cushioned but permitted to slide laterally or endwise under impact, the lenses may also be broken.

The present invention provides a type of cushioned case for eyeglasses which adequately protects even rimless glasses from breakage. I accomplish this in general by providing resilient pads bearing against the front of the lenses for direct cushioning and a resilient gripping material bearing against the bows, frames, etc., on the back side of the glasses, so as to cushion the shock laterally as well as front or back; and at the same time so gripping or holding the glasses that they will be returned to substantially their original position after the shock, and not slide to the end or edge of the case.

In order to have the desired cushioning action without the glasses sliding endwise when the case falls on one end, it is necessary to gently but firmly grip the glasses in a resilient manner. The best material that I have found for this purpose is sponge rubber; the numerous yielding pores and projections of the uncovered surface of sponge rubber tend to envelope and grip the bows, nose pieces, or other projections of the eyeglasses, so that the glasses do not slide; and the sponge rubber is elastic enough to cushion the impact and then return the glasses to substantially their original position.

While I prefer sponge rubber, any other resilient, softly gripping material may be used that can partially envelope the bows or other projecting parts so as to resiliently hold the glasses against slippage; for example, spongy materials, loose springy felts, and various woven or knitted fabrics of a loose springy nature may be used. It is important to have a large number of little gripping elements of an elastic nature available, so that the glasses will surely be gripped by enough of them to hold the glasses as described, regardless of how carelessly the glasses are placed in the case.

A preferred form of the invention is shown by way of illustration in the accompanying drawing, forming part of this specification, in which Figure 1 is a plan view of a glasses case open, with the eyeglasses indicated in broken lines.

Similar reference numerals refer to similar parts throughout the various views.

Figure 1:
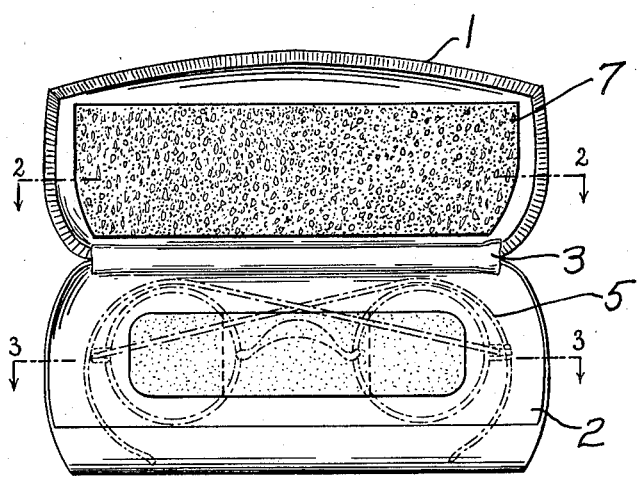
Figure 2:
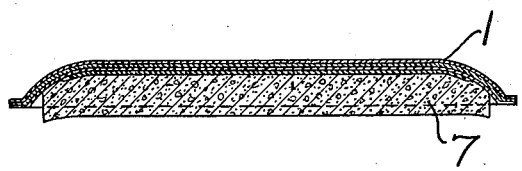
Figure 2 is a cross-section of the cover or top of the case, taken on the line 2—2 of Figure 1.
Figure 3:
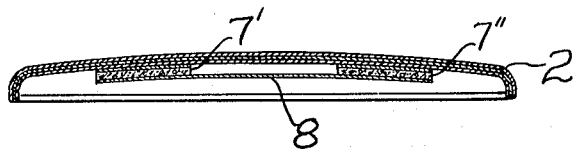
Figure 3 is a cross-section of the bottom of the case, taken on the line 3—3 of Figure 1.

In the drawing, an eyeglass case is shown having a top portion 1 and a bottom or body portion 2, to which the top or lid 1 is attached by the usual spring hinge 3. The eyeglasses, when in the case, are normally placed as indicated by the broken lines 5.

In the present invention the top of lid 1 of the case has attached to its inside face a rather thick mass of sponge rubber 7 as shown, which, in spite of its thickness, is capable of yielding sufficiently to accommodate the bows or other projecting parts of the glasses when the case is closed. Such parts then become somewhat embedded in the sponge rubber and are resiliently restrained against sliding to the edge of the case when it is dropped. The rubber 7 is preferably in one continuous pad, but may be cut up into numerous pads if desired.

The bottom or body 2 of the case may also be provided with a similiar sponge rubber cushion or cushions but as the glass of the lenses tends to come in direct contact with the cushioning elements on that side, it is generally desirable to cover the sponge rubber pads 7' and 7" with a layer of velvet 8 or other suitable fabric, which has a better polishing action on the lenses,—as sponge rubber in direct contact with glass has a tendency to smear or fog the lenses. The sponge rubber 7 on the other side, is usually held somewhat out of contact with the center of the lenses at least, by the bows or nose pieces, as described.

I have found that it is sufficient to have the exposed spongy rubber 7 on one side only, though of course it can be put on both sides if desired.

I have found from repeated experiment that a glasses case so constructed will almost invariably protect even rimless glasses from breakage in the case, however they may be dropped, or even when thrown with considerable force the length of a room.

The pads 7, 7', 7'', may be cemented to the case at the time of manufacture, as may also the fabric 8. When it is desired to apply the invention to glasses cases of the ordinary type already in use, the sponge pads may be sold separately and attached to the inside of the case by any suitable adhesive.

While I have in the foregoing given certain specific examples, it will be understood that they are merely for purposes of illustration, to make clear the principles, and that the invention is subject to various modifications and adaptations in different installations as will be apparent to those skilled in the art without departing from the scope of the invention as stated in the following claims:

I claim:

1. In an eyeglass case, the combination of a body, a cover hinged thereto, and resilient cushioning means of sufficient bulk when uncompressed to substantially fill the major portion of the case but sufficiently soft and resilient so that when glasses are placed therein the bows and other projecting parts of the glasses will become partially embedded in the resilient means so as to be yieldingly held at various points sufficient to permit extended end motion without concentration of stress, whereby the glasses may be resiliently held from striking the end of the case and resiliently returned to substantially their original position after ordinary end impacts.

2. In an eyeglass case, the combination of a body, a cover hinged thereto, and resilient cushioning means of sufficient length and area to substantially cover glasses when placed in the case, said resilient means being so thick that the case cannot be closed on glasses without partially embedding them in the resilient cushion, said resilient means being so yielding that the embedding action does not preclude closing the cover in the ordinary manner, whereby the glasses may be resiliently held at distributed points in a bed sufficiently soft and thick to allow resilient end play.

3. In an eyeglass case, the combination of a body portion, a cover hinged thereto, and resilient cushioning means extending approximately the length and breadth of the case, said resilient means comprising a spongy material having a large number of small gripping elements adapted to resiliently grip and mold themselves to the bows and other projecting parts of eyeglasses when in the case, said spongy material being so thick that the glasses may be oscillated endwise on the resilient means while the gripping elements retain their hold and tend to return the glasses to substantially their original position.

4. In an eyeglass case, the combination of a body portion, a cover, and resilient cushioning means mounted on the cover, said resilient means having an exposed surface composed of a mass of elastic gripping elements, and being sufficiently thick so that glasses when in said case will be partially embedded in them, said cushioning means being longer than the glasses when in the case so as to provide for resilient end play.

5. In an eyeglass case, the combination of a body portion, a cover hinged thereto, cushioning means of resilient spongy material mounted on the inside of said cover and extending substantially to the longitudinal ends thereof, said cushioning means being thicker than the depth of the cover so as to project into the body portion when uncompressed, and having an exposed open cell spongy surface so that projecting parts of eyeglasses may become readily embedded therein, said case and cushion extending beyond the ends of eyeglasses when in the case so as to provide for resilient end motion.

MILLARD E. VAN ORDEN.

DISCLAIMER 2,094,861.—*Millard E. Van Orden*, Ithaca, N. Y. EYEGLASS CASE. Patent dated October 5, 1937. Disclaimer filed January 19, 1939, by the patentee.

Hereby enters this disclaimer to claims 1, 2, 3, 4, and 5 of said Letters Patent.

[*Official Gazette February 28, 1939.*]